(No Model.)

W. A. LEGGO.
FAUCET.

No. 307,778. Patented Nov. 11, 1884.

Attest:
F. W. Howard
M. J. Clagett

Inventor;
William A. Leggo
Per Dyer & Wilber
Atty.

N. PETERS. Photo-Lithographer, Washington, D. C.

UNITED STATES PATENT OFFICE.

WILLIAM A. LEGGO, OF NEW YORK, N. Y.

FAUCET.

SPECIFICATION forming part of Letters Patent No. 307,778, dated November 11, 1884.

Application filed February 7, 1882. (No model.)

*To all whom it may concern:*

Be it known that I, WILLIAM A. LEGGO, of New York, in the county of New York and State of New York, have invented a new and useful Improvement in Bungs and Faucets; and I do hereby declare that the following is a full and exact description of the same, reference being had to the accompanying drawings, and to the letters of reference marked thereon.

The object of my invention is to so combine a bung and faucet for barrels, kegs, &c., that the faucet may be used without withdrawing the bung from the barrel, while the insertion of the faucet opens the bung-valve, and its withdrawal closes the same; and the invention consists in the novel devices employed by me for this purpose, as hereinafter fully explained, and pointed out by the claims.

Figure 1:
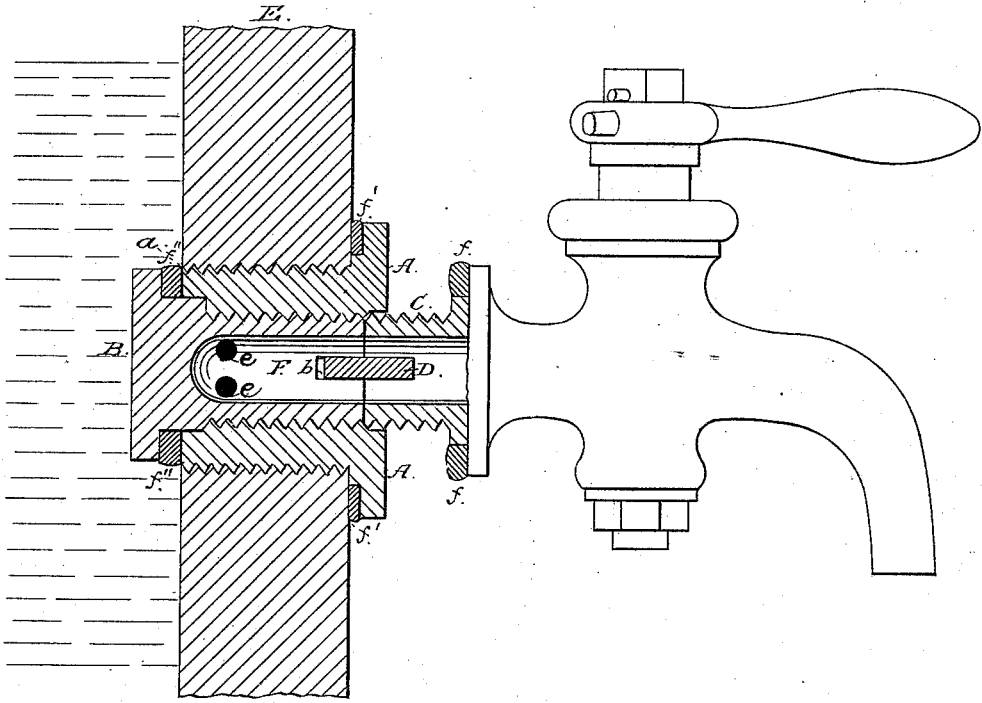
Figure 2:
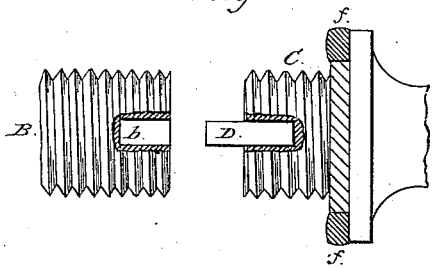
Figure 3:
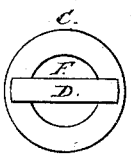

In the accompanying drawings, Figure 1 is a sectional view of an apparatus constructed according to my invention, and Figs. 2 and 3 views of detached portions thereof.

E is the side of the barrel, provided with an aperture or bung-hole, *a*. In this is inserted the metal bushing A, which is screw-threaded, both inside and out. Its diameter is greater outside of the barrel, and it is here provided with an elastic washer, *f'*, which is pressed firmly against the side of the barrel. B is the bung, screwed into the bushing A. It is cored out at F, and apertures *e e* extend from its exterior into the hollow space F, to allow the liquid to enter this space. Its enlarged inner end bears against the inner end of the bushing A, an elastic washer, *f'''*, being used to prevent leakage. The outer end of the bung has a transverse slot, *b*. C is the inner end of the faucet, which is screw-threaded, so that it may enter the plug A. Embedded in its end, and extending therefrom, is a transverse steel key, which fits into the slot *b*, (see Figs. 2 and 3,) and acts to lock the faucet and bung together. The faucet is provided with an elastic washer, *f*, which bears against the plug A when the faucet is screwed in. The bung, with its bushing A, is first inserted in the bung-hole, as seen in Fig. 1, the end C of the faucet then inserted, the key D entering the slot *b*, a small portion of the interior of A being left plain and without screw-threads to admit of this being done. Then by turning the faucet round and round the bung B is screwed back into the interior of the barrel until the washer *f* reaches the plug A. The valve is thus opened and the liquid is now free to flow through the apertures *e e* and bung B to the faucet, where its flow may be controlled by the faucet-valve in the usual manner. By unscrewing the faucet the bung is drawn out and the apertures *e e* withdrawn from the liquid, which now ceases to flow.

Instead of attaching the key D to the faucet, it may project from the bung, the corresponding slot being cut in the end of the faucet.

When desired, the entire arrangement may be withdrawn from the barrel by unscrewing the bushing A.

What I claim is—

1. The combination, with the perforated and slotted hollow bung B, of the faucet having the hollow screw-threaded and slotted end C, provided with the removable key D, and elastic washer *f*, substantially as described and shown.

2. The combination of the metal bushing A, the perforated and slotted bung B, the faucet with screw-threaded and slotted end C, the intermediate removable key, D, and the elastic washers *f f' f'''*, substantially as described and shown.

This specification signed and witnessed this 24th day of June, 1881.

WILLIAM A. LEGGO.

Witnesses:
H. W. SEELY,
RICHD. N. DYER.